US009212870B2

(12) United States Patent　　　(10) Patent No.:　　US 9,212,870 B2
　　　 Gate　　　　　　　　　　　　　(45) Date of Patent:　　　Dec. 15, 2015

(54) GUIDANCE METHOD AND APPARATUS

(75) Inventor: Martin Simon Gate, Bristol (GB)

(73) Assignee: MBDA UK LIMITED, Hertfordshire (GB)

( * ) Notice: Subject to any disclaimer, the term of this patent is extended or adjusted under 35 U.S.C. 154(b) by 0 days.

(21) Appl. No.: 13/254,738

(22) PCT Filed: Aug. 23, 2011

(86) PCT No.: PCT/GB2011/051585
§ 371 (c)(1),
(2), (4) Date: Jan. 17, 2012

(87) PCT Pub. No.: WO2012/025747
PCT Pub. Date: Mar. 1, 2012

(65) Prior Publication Data
US 2013/0153707 A1　　Jun. 20, 2013

(30) Foreign Application Priority Data

Aug. 23, 2010 (EP) ..................................... 10251478
Aug. 23, 2010 (GB) ................................... 1014064.8

(51) Int. Cl.
*F42B 15/01* (2006.01)
*F41G 7/20* (2006.01)
(Continued)

(52) U.S. Cl.
CPC .. *F41G 9/00* (2013.01); *F41G 7/22* (2013.01); *F41G 7/30* (2013.01); *G05D 1/12* (2013.01)

(58) Field of Classification Search
USPC .............. 244/3.1–3.3; 89/1.11; 702/1, 2, 6, 9; 703/3, 5; 342/61, 62, 175, 195
See application file for complete search history.

(56) References Cited

U.S. PATENT DOCUMENTS 4,234,142 A * 11/1980 Yost et al. ..................... 244/3.21
4,456,862 A *  6/1984 Yueh ............................. 244/3.16
(Continued)

FOREIGN PATENT DOCUMENTS

EP　　0 526 969 A2　　2/1993
GB　　2 454 987 A　　5/2009
JP　　2008-275206　　11/2008

OTHER PUBLICATIONS

Salmond D. et al., "Particles and Mixtures for Tracking and Guidance", in A. Doucet, N. de Freitas, and N. Gordon, editors, *Sequential Monte Carlo Methods in Practice*, pp. 518-532, Springer-Verlang (2001).
(Continued)

*Primary Examiner* — Bernarr Gregory
(74) *Attorney, Agent, or Firm* — Scully, Scott, Murphy & Presser, PC

(57) ABSTRACT

A method of guiding a pursuer to a target is provided, and is of particular use when the possible target location is described by non-Gaussian statistics. Importantly, the method takes into account the fact that different potential target tracks in the future have significantly different times to go. That can give rise to emergent behavior, in which the guidance method covers several possible outcomes at the same time in an optimal way. An example embodiment of the method combines Particle Filter ideas with Swarm Optimization techniques to form a method for generating guidance commands for systems with non-Gaussian statistics. That example method is then applied to a dynamic mission planning example, to guide an airborne pursuer to a ground target travelling on a network of roads where the pursuer has no-go areas, to avoid collateral damage.

17 Claims, 13 Drawing Sheets

(51) Int. Cl.
*F41G 9/00* (2006.01)
*G05D 1/12* (2006.01)
*F41G 7/22* (2006.01)
*F41G 7/30* (2006.01)

(56) References Cited

U.S. PATENT DOCUMENTS

| | | | | |
|---|---|---|---|---|
| 4,494,202 | A * | 1/1985 | Yueh | 244/3.15 |
| 4,502,650 | A * | 3/1985 | Yueh | 244/3.15 |
| 5,435,503 | A * | 7/1995 | Johnson et al. | 244/3.15 |
| 5,637,826 | A * | 6/1997 | Bessacini et al. | 244/3.12 |
| 5,764,510 | A | 6/1998 | Cameron et al. | |
| 6,064,332 | A * | 5/2000 | Cloutier | 244/3.19 |
| 6,279,851 | B1 * | 8/2001 | Huss et al. | 244/3.15 |
| 6,456,906 | B1 * | 9/2002 | Hua | 701/3 |
| 6,666,410 | B2 * | 12/2003 | Boelitz et al. | 244/3.2 |
| 6,845,938 | B2 * | 1/2005 | Muravez | 244/3.11 |
| 6,871,105 | B2 * | 3/2005 | Aragones et al. | 244/3.21 |
| 7,137,588 | B2 * | 11/2006 | Humphrey | 244/3.15 |
| 7,249,730 | B1 * | 7/2007 | Flippen, Jr. | 244/3.15 |
| 7,394,047 | B1 * | 7/2008 | Pedersen | 244/3.1 |
| 7,460,957 | B2 * | 12/2008 | Prange et al. | 702/9 |
| 7,473,876 | B1 * | 1/2009 | Pedersen et al. | 244/3.1 |
| 7,511,252 | B1 * | 3/2009 | Pedersen et al. | 244/3.1 |
| 7,737,878 | B2 * | 6/2010 | van Tooren et al. | 244/3.15 |
| 8,436,283 | B1 * | 5/2013 | Tournes et al. | 244/3.15 |
| 2008/0059056 | A1 | 3/2008 | Chavira et al. | |

OTHER PUBLICATIONS

Arulampalam, M. Sanjeev et al., "A Tutorial on Particle Filters for Online Nonlinear/Non-Gaussian Bayesian Tracking", IEEE Transactions on Signal Processing (Feb. 2002), vol. 50, No. 2, pp. 174-188.
Gordon, N.J. et al., "Novel approach to nonlinear/non-Gaussian Bayesian state estimation", IEEE Proceedings F. Communications, Radar & Signal Processing, Institution of Electrical Engineers (Apr. 1, 1993), vol. 140, No. 2, Part F, pp. 107-113.
Salmond, D. J. et al., "Target tracking and guidance using particles", Proceedings of the American Control Conference (Jun. 25-27, 2001), vol. 6, pp. 4387-4392.
Kennedy, James et al., "Particle Swarm Optimization", Neural Network (1995), Proceedings, IEEE International Conference on Perth, WA, Australia, Nov. 27-Dec. 1, 1995, pp. 1942-1948.
Yang, Bo et al., "A Master-Slave Particle Swarm Optimization Algorithm for Solving Constrained Optimization Problems", Proceedings of the $6^{th}$ World Congress on Intelligent Control and Automation (Jun. 21-23, 2006), Dalian, China, vol. 1, pp. 3208-3212.
European Search Report dated Jun. 29, 2011 issued in EP 10 25 1478.
UK Search Report dated Feb. 7, 2011 issued in GB 1014064.8.

* cited by examiner sweep time = 130   measure time = 10   iteration = 5 sweep time = 120  measure time = 30  iteration = 5 sweep time = 90  measure time = 80  iteration = 5 sweep time = 10   measure time = 0   iteration = 5 sweep time = 170  measure time = 40  iteration = 5 sweep time = 160  measure time = 120  iteration = 5 sweep time = 160  measure time = 140  iteration = 5

Fig.13.

EXAMPLE METHOD
GUIDANCE & OBSERVATION LOOP
10    Repeat:
20        Provide possible target locations
          OPTIMISATION LOOP
30        For J = 1 to no. of iteration steps
40            Provide candidate solutions
              CANDIDATES LOOP
50            For K = 1 to no. of candidates
                  COST LOOP
60                Repeat:
70                    Calculate costate trajectory until reach a target PONA
80                    Adjust costate to disregard passed target
90                Until final target PONA reached
100               Record cost of candidate solution
110           Next K
120           Calculate new candidate solutions
130       Next J
140       Apply calculated optimal guidance control
150   Until target is reached

GUIDANCE METHOD AND APPARATUS

FIELD OF THE INVENTION

This invention relates to the field of guidance, and in particular to a method and apparatus for guiding a pursuer to a goal, for example a target. More particularly, the invention relates to a method and apparatus for guiding a pursuer to a goal with minimal expected cost in a system in an uncertain state but for which the costs are known. Still more particularly, the invention relates to a method of guiding a pursuer to a target where the target cannot readily be characterised using Gaussian statistics.

BACKGROUND ART

The fundamental problem in munition guidance is determining the flight path that a missile or other guided munition needs to take to in order to reach a given target. More specifically, the problem is determining the controls that should be applied to the munition during its flight in order to reach the target, for example determining the lateral acceleration that is needed to achieve the desired flight path.

Classical approaches to guidance involve selecting a geometric law governing the flight path, for example line-of-sight guidance, pure pursuit or parallel navigation, and then determining and applying to the munition the control that is needed, at any given moment during its flight, to minimise the error between the actual state (e.g. position, velocity) of the munition and the ideal state determined by the guidance law. For the case of parallel navigation, the most commonly used corresponding guidance law is proportional navigation (PN). Parallel navigation is the constant-bearing rule, so that the direction of the line-of-sight from the munition to the target is kept constant relative to an inertial frame of reference, i.e. in the planar case, $\dot{\lambda}=0$ where $\lambda$ is the angle between the munition-target line of sight and a reference line in the inertial frame; the PN guidance law is then $a_{M_c}=k\dot{\lambda}$, where $a_{M_c}$ is the command for lateral acceleration and $k$ is a constant (gain); thus, the lateral acceleration applied to the munition is proportional to the rate of change with time of angle $\lambda$.

Many modern guidance systems rely on an alternative class of techniques, known collectively as optimal guidance. In optimal guidance, rather than determining the control in view of a geometric law, the control is determined with a view to minimising a cost function. The cost function is typically a function of the miss distance, i.e. the distance by which the munition will miss its target, and the control effort, i.e. the amount of effort required to reach the target (e.g. the amount of fuel required). The guidance problem typically also involves constraints, for example relating to the dynamics of the munition. Solution of the optimisation problem, analytically or by computer-implemented numerical methods, provides the optimal control, which minimises the cost function.

In practical guidance situations, a target state is usually not known and has to be determined through measurements. The measurements are used to determine an evolving probability distribution of the future location of the target, to which the pursuer is to be optimally guided. When the location of the target can be described using a Gaussian probability distribution, guidance is relatively straightforward. However, when the target distribution cannot be described using a Gaussian probability distribution, for example when the target location is limited to a number of possible discrete locations (e.g. a number of possible road routes that the target may be taking), the guidance problem becomes more difficult.

The classic way to represent the target probability distribution when it is non-Gaussian is to use a Particle Filter (introduced by N. J. Gordon, D. J. Salmond, and A. F. M. Smith, in their seminal paper *Novel approach to nonlinear/non-Gaussian Baysian state estimation*, IEE Proc.—F, vol 140, No 2, pp 107-113, 1993). M. S. Arulampalam, S. Maskell, N. Gordon, and T. Clapp (in *A tutorial on particle filters for non-linear/non-gaussian Bayesian tracking*, IEE Trans. Signal processing, Vol. 50, February 2002) provide an introductory tutorial on Particle Filtering, and A. Doucet, N. de Freitas, and N. Gordon (editors, in *Sequential Monte Carlo Methods in Practice*. Springer-Verlang, 2001) give a collection of papers describing the theory behind Particle Filtering, together with various improvements to and applications of Particle Filtering. Particle Filtering essentially describes the future target distribution using a weighted sample of target trajectories from the present target distribution. It simplifies the implementation of the Bayesian rule for measurement updates by modifying just the particle weights and then resampling after each measurement. The resulting weighted target trajectory population is used to calculate approximately an expected value of a function of the target state as a random variable. That is done just by applying the function to the target trajectory sample and then forming a weighted sum of the results using the particle filter weights. Although that provides a way to measure and predict target properties, it does not deal with how to guide the pursuer to the target.

One of the outstanding problems in Guidance and Control is to guide a pursuer to a target that has genuinely non-Gaussian statistics, so that the guidance algorithm gives the best average outcome against miss distance, pursuer manoeuvring and pursuer state costs, subject to pursuer state constraints. D. J. Salmond, N. O. Everett, and N J Gordon ("Target tracking and guidance using particles", in *Proceedings of the American Control Conference*, pages 4387-4392, Arlington, Va., Jun. 25-27, 2001) pioneered this area by using a simple guidance law, with a fixed shape, and in a following paper (D Salmond and N. Gordon, "Particles and mixtures for tracking and guidance", in A. Doucet, N. de Freitas, and N. Gordon, editors, *Sequential Monte Carlo Methods in Practice*, pages 518-532. Springer-Verlang, 2001) classified several types of suboptimal guidance solutions.

It would be advantageous to provide an improved method and apparatus for guidance to a target having non-Gaussian statistics.

DISCLOSURE OF THE INVENTION

A first aspect of the invention provides a method of guiding a pursuer to a target, the method comprising:
  (a) providing a plurality of possible target trajectories, weighted to represent a probability distribution of the target trajectories;
  (b) providing a plurality of candidate guidance controls, parameterised by a candidate guidance parameter;
  (c) for each of a plurality of values of the candidate guidance parameter:
    a. determining a projected pursuer trajectory resulting from the candidate guidance control corresponding to the candidate guidance parameter value;
    b. using the projected pursuer trajectory so far developed, determining the next occurrence of a termination condition for the pursuer trajectory relative to any of the target trajectories for which a termination condition has not yet occurred;

c. adjusting the projected pursuer trajectory, subsequent to that termination-condition occurrence, to account for that target trajectory;

d. repeating steps b and c until the termination conditions corresponding to all of the plurality of possible target trajectories have been accounted for; and e. recording a cost for the candidate guidance control based on the projected pursuer trajectory and the miss distances at the termination-condition occurrence for each target trajectory;

(d) generating a revised plurality of values of the candidate guidance parameter in view of the recorded costs of the candidate guidance controls;

(e) repeating steps (c) and (d) a plurality of times and identifying an optimal guidance control based on the recorded costs;

(f) applying the optimal guidance control to the pursuing vehicle to alter its actual trajectory;

(g) obtaining updated possible target trajectories; and (h) repeating steps (b) to (g) a plurality of times.

The termination condition relative to a target trajectory may be the point of nearest approach of the projected pursuer trajectory to the target trajectory.

The candidate guidance parameter may be a costate parameter.

The target trajectories may be described by non-Gaussian statistics. The target trajectories may be possible routes of a target vehicle. The possible routes may comprise a number of possible discrete trajectories, for example road routes. Road routes are an example of possible target trajectories where the next occurrence of a termination condition for the pursuer trajectory relative to each of the target trajectories is significantly different.

The new candidate guidance controls may be generated using an optimisation algorithm. The optimisation algorithm may be a swarm algorithm. The swarm algorithm may be a master-slave swarm algorithm. It may be that, in the master-slave algorithm, if no feasible solutions are found a constraint weight is increased; similarly, a constraint weight may be increased if there is too much slack.

The method may comprise uncurling a projected trajectory by damping a high-frequency oscillation in the projected trajectory.

The method may comprise providing one or more pursuer state constraints such that each cost recorded in step (e) for the candidate guidance control is subject to said pursuer state constraint(s). Pursuer state constraints might take into account for example no go areas for the pursuer.

A second aspect of the invention provides processing apparatus arranged to carry out the steps of a method according to the first aspect of the invention.

The processing apparatus may be comprised in the pursuer, which may, for example, be a vehicle. The vehicle may be an air vehicle, for example an aircraft or a missile or other guided munition. Thus, a third aspect of the invention provides a vehicle comprising apparatus according to the second aspect of the invention. The vehicle may include a short-range sensor to acquire the target and home in on it using conventional homing, for example when the vehicle is less than 1 km, less than 500 m or less than 250 m from the target.

Alternatively, the processing apparatus may be separate from the pursuer, for example in a ground-based radar station.

It will of course be appreciated that features described in relation to one aspect of the present invention may be incorporated into other aspects of the present invention. For example, the method of the invention may incorporate any of the features described with reference to the apparatus of the invention and vice versa.

BRIEF DESCRIPTION OF THE DRAWINGS

Example embodiments of the invention will now be described by way of example only and with reference to the accompanying drawings, of which:

FIG. 13 is a flowchart showing an example embodiment of the method of the invention.

DETAILED DESCRIPTION

Figure 1:
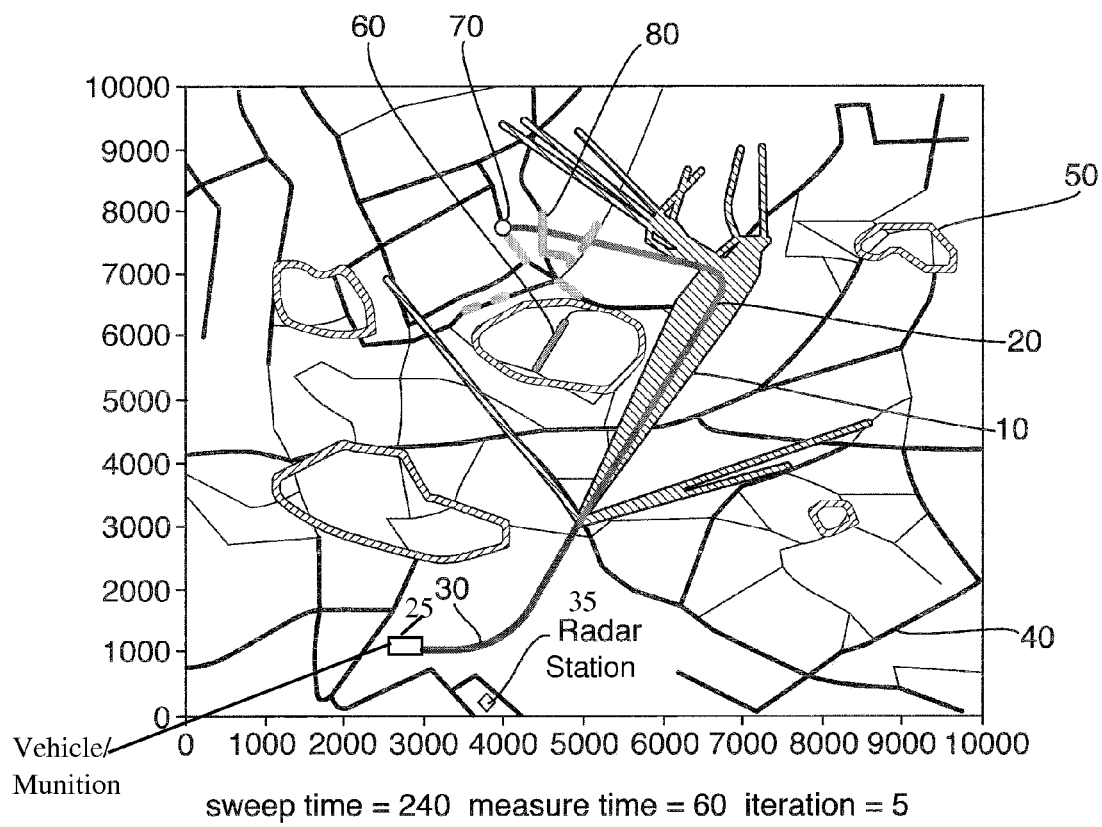
FIG. 1 is a snapshot from a .avi file showing the output of a method according to an example embodiment of the invention, labelled with comments.

In an example embodiment of the invention, a method of guiding a pursuing vehicle to a target takes into account the fact that different possible target locations have different times to go, and uses directly raw Particle Filter output. It deals with the case where the measurement outcomes are not affected by the pursuer state (e.g. where the measurement is done by a third-party surveillance radar, rather than by the pursuer itself—in the latter case, the quality of measurement could be a function of the range to the target).

In the discussion below, for a given Particle Filter target trajectory sample, it is shown how to derive differential equations for guidance, and how they are influenced by the Particle Filter output. The guidance law is shown to have costates that jump at the points at which the pursuer passes the Point Of Nearest Approach (PONA) for each target track sample.

A pursuer is at a (at least approximately) known position and on a (at least approximately) known heading. It receives information regarding the possible locations of a target. What guidance control should be applied to the pursuer to alter its trajectory and optimally guide it to its target, given the received information? The approach adopted is to provide a set of candidate guidance controls and to grade each one by assigning it a cost. The grading is then used to generate a new set of candidate guidance controls, according to an optimisation algorithm described in detail below. After a plurality of iterations of the algorithm, the candidate guidance control with the best grading is selected and applied to the pursuer, for example by applying speed and/or directional controls appropriate to the pursuer.

We first work through an example calculation of the expected cost for a candidate guidance control.

The exact present and future locations of the target are not known, but can be represented as a probability distribution. Let $y(t:\omega)$ be the random variable representing the state of the target as a function of time. We can regard this as an ensemble of state trajectories $\Omega$ with probability measure dPr. Although the optimal guidance control calculated by the method is to be applied in the short term (i.e. once the calculation is complete), the method involves predicting the future trajectory of the pursuer for each candidate guidance control, on the assumption that that candidate guidance control is to be applied in the short term. The consequences of applying a candidate guidance control may be such that the pursuer is predicted to move towards and away from the target during the engagement.

In general, the cost for a target instance is $$J(\omega) = \phi(x,y(t,w))|_{t=tp(\omega)} + \int_0^{tp(\omega)} L(u,x,t)dt \quad (1)$$

where $\phi$ is the terminal cost, representing the cost of missing the target, L is the pursuer integrated cost for the pursuer trajectory under consideration, x is the present state of the pursuer, u is the candidate guidance control under consideration, and $t_p$ is the terminal time up to which the cost is measured. This terminal time is the "point of nearest approach" (PONA) for the target instance. Every time the pursuer passes a local PONA, it passes through a point of inflection given by the condition $$\psi(x,y^{(i)},\dot{y}^{(i)})|_{T_p(\omega)} = 0 \quad (2)$$

u is the control input used to guide the pursuer with state x given by the constraint equation $$\dot{x} = f(x,u,t) \quad (3)$$

The particular forms of functions $\phi$, L, $\psi$ and f may be defined for a given pursuit scenario.

The strategy adopted is to choose a guidance law to minimize the expected cost over all possible target trajectories:

$$E(u) = \int_\Omega J(\omega) dPr \quad (4)$$

subject to the above constraints (note the dependence on the guidance command u). The cost is thus weighted by the probability dPr of target tracks $\Omega$. In this example, there is no interaction between tracks.

Particle Filters give a convenient way to represent E(u) as a weighted sum of contributions. If we assume J is a measurable function using measure dPr then a Particle Filter selects a sequence of weights and tracks $\{(w_i,\omega_i) \in R^+ \times \Omega | i \in N\}$ such that $$E(u) = \lim_{n \to \infty} \frac{\sum_{i=1}^n w_i J(\omega_i)}{n} \quad (5)$$

If J(.) is a function that takes on the constant value 1 then from Eq. (5) and the definition Eq. (4) we get $$\lim_{n \to \infty} \frac{\sum_{i=1}^n w_i J(\omega_i)}{n} = 1 \quad (6)$$

since dPr is a probability measure.

In practice the expected overall cost E(u) is approximated by summing over a finite number N of target tracks to give the approximation:

$$E(u) = \sum_{i=1}^n w_i J(\omega_i) \quad (7)$$

where we normalize the weights to satisfy $$\sum_{i=1}^N w_i = 1 \quad (8)$$

to ensure the result behaves like a probability distribution. That approach gives, as an approximation Eq. (4), using Eq. (1):

$$E(u) = \sum_{i=1}^n w_i \phi(x, y^{(i)}) + \int_{t_0}^{t_f} n(t) L(u, x, t) dt \quad (9)$$

Where $$t_i = t_p(\omega_i); \; y^{(i)} = y(\omega_i); \; t_f = \max(t_i, \ldots, t_N) \quad (10)$$

$$h(t; i) = \begin{cases} 1 & \text{if } t \leq t_i \\ 0 & \text{otherwise} \end{cases} \quad (11)$$

$$n(t) = \sum_1^N w_i h(t; i) \quad (12)$$

Thus the expected cost for each candidate guidance control u includes step functions h which cause the pursuer cost for the trajectory (i.e. the integrand in Eq. (9)) to step each time the PONA is passed for each of the N target tracks under consideration; i.e., once the PONA is passed, at time $t_i$, for a possible target trajectory in the integration in Eq. (9), that target trajectory no longer contributes a cost to the remainder of the integration (i.e. the integration from $t_i$ to $t_h$ with $t_f$ being the PONA of the final target trajectory to be passed).

To solve (9), we use the well-known approach of adjoining the Lagrangian multipliers, to give a new cost function $J_A$:

$$J_A = \sum_{i=1}^N w_i \Phi(x, y^{(i)}) + \int_{t_0}^\infty \{H(u, x, t) - n(t)\lambda^T(t)\dot{x}\} dt \quad (13)$$

$$H = n(t)\{L(u, x, t) + \lambda^T f\} \quad (14)$$

$$\Phi^{(i)} = \Phi(x, y^{(i)}) = \phi(x, y^{(i)}) + v_i \psi(x, y^{(i)}, \dot{y}^{(i)}) \quad (15)$$

H is the weighted Hamiltonian, and the function $\lambda^T$ is the state-sensitivity costate and the function $v_i$ is the PONA sensitivity costate.

Integration by parts gives:

$$J_A = \sum_{i=1}^N w_i \Phi(x, y^{(i)}) + n(t_0)\lambda^T(t_0)x(t_0) - n(t_\infty)\lambda^T(t_\infty)x(t_\infty) + \int_{t_0}^\infty \left\{ H(u, x, t) + \frac{d(n(t)\lambda^T)}{dt} x \right\} dt \quad (16)$$

Now consider the variation of $J_A$ due to variation of u with fixed time $t_0$ and no variation of the initial condition. Noting that $\lambda(\infty) = 0$ because there is no influence beyond time $t_f$, we get $$\delta J_A = \sum_{i=1}^{N} w_i \left\{ \frac{\partial \Phi^{(i)}}{\partial x} [\delta x + \dot{x} \delta t_i] + \frac{\partial \Phi^{(i)}}{\partial t} \delta t_i \right\} + \quad (17)$$

$$Q(t_i) \delta t_i + \int_{t_0}^{t_f} \left\{ \left[ \frac{\partial H}{\partial x} + n \dot{\lambda}^T + \dot{n} \lambda^T \right] \delta x + \frac{\partial H}{\partial u} \delta u \right\} dt$$

where $$Q(t_i) = n(t_i -) L(u(t_i -), x(t_i -), t_i -) - n(t_i +) L(u(t_i +), x(t_i +) t_i +) \quad (18)$$

is the jump in the original integrand at $t_i$ when $\dot{x} = f(u,x,t)$. Reorganizing Eq. (17) gives $$\delta J_A = \sum_{i=1}^{N} w_i \left\{ \frac{d\Phi^{(i)}}{dt} \delta t_i \right\} \bigg|_{t_i}$$

$$+ Q(t_i) \delta t_i + \int_{t_0}^{t_f} \left\{ \left[ \sum_{i=1}^{N} w_i \left( \frac{\partial \Phi^{(i)}}{\partial x} - (\lambda^T + 0.5 \delta \lambda^{(i)}) \right) \Delta(t_i) + \left( \frac{\partial H}{\partial x} + n \lambda^T \right) \right] \right.$$

$$\left. \delta x + \frac{\partial H}{\partial u} \delta u \right\} dt$$

where $\Delta(s)$ is the Dirac delta function with the property $\int g(t) \Delta(s) dt = g(s)$ and $$\frac{d\Phi^{(i)}}{dt} = \frac{\partial \Phi^{(i)}}{\partial x} \dot{x} + \frac{\partial \Phi^{(i)}}{\partial t} \quad (19)$$

By suitable choice of the costate functions $\lambda$ and $v_i$, we can set $$w_i \frac{d\Phi^{(i)}}{dt} \bigg| = -Q(t) \quad (20)$$

$$\dot{\lambda}^T = \sum_{i=1}^{N} \frac{w_i}{n(t)} \left\{ -\frac{\partial \Phi^{(i)}}{\partial x} + (\lambda^T + 0.5 \delta \lambda^{(i)}) \right\} \Delta(t_i) - \frac{\partial L}{\partial x} - \lambda^T \frac{\partial f}{\partial x}; \quad (21)$$

$$\lambda(t_f +) = 0$$

which gives $$\delta J_A = \int_{t_0}^{t_f} \frac{\partial H}{\partial u} \delta u \, dt = 0 \quad (22)$$

That is near zero for all possible small $\delta u$ giving a point of inflection when $$\frac{\partial H}{\partial u} = 0 \quad (23)$$

Expanding Eq. (23) slightly gives $$\frac{\partial L}{\partial u} + \lambda^T \frac{\partial f}{\partial u} = 0 \quad (24)$$

which gives the optimal control law once the influence costate functions $\lambda$ have been evaluated using the Eq. (21).

Eq. (24) is close to the classic optimal solution of continuous systems, but there is an added effect due to the spread of the influence of the unknown position of the target PONA: the solution has a small jump in the co-state $\lambda$ at each target particle PONA time, of amount $\delta \lambda^{(i)}$. Equation (21) gives $$(n(t_i -) - 0.5 w_i) \delta \lambda^{(i)} = w_i \left\{ -\frac{\partial \Phi^{(i)}}{\partial x} + \lambda^T + 0.5 \delta \lambda^{(i)} \right\} \bigg|_{t=(t_i-)} \quad (25)$$

(The factor of 0.5 is due to integrating a delta function multiplied by a step at the delta. For instance let $U(t)$ be the unit step at $t=0$ then the delta function is $$\Delta(t) = \frac{dU(t)}{dt}$$

and we have $$0.5 \Delta(t) = 0.5 \frac{dU(t)}{dt} = 0.5 \frac{dU^2(t)}{dt} = U(t) \frac{dU(t)}{dt} = U(t) \Delta(t);$$

also, the equation must be multiplied by $n(t)$ before equating sides at $t_i$.)

Giving:

$$\delta \lambda^{(i)} = \frac{w_i}{(n(t_i -) - w_i)} \left\{ -\frac{\partial \Phi^{(i)}}{\partial x} + \lambda^T + \delta \lambda^{(i)} \right\} \bigg|_{t=(t_i-)} \quad (26)$$

while integrating the solution for $\lambda$ (note that the value of the terms are also dependent on $\lambda$ and so must be evaluated before the jump).

Thus an optimal guidance solution u can be calculated by numerical integration of Eq. 24, taking into account the jumps $\delta \lambda^{(i)}$ in the costate function $\lambda$ that occur at each target trajectory PONA.

We now look at a specific application of the example method, for the illustrative case of a constant-speed pursuer in the xy-plane. This is useful for dynamic mission planning of an airborne pursuer against mobile ground targets. It is a simple test case for the guidance algorithm, and illustrates how to apply the general guidance equations. The derived guidance equations can be used for dynamic mission planning, where we assume the pursuer travels at constant cruise speed prior to engaging the target. Of course the dynamics can be extended to deal with a more representative dynamic behaviour, for example if there is a need for excessive latex, with resulting induced drag. However this simple case can be implemented to run at or near real time on a Personal Computer and illustrates many features used in implementing such a guidance law.

Once one knows how to solve for the costate jumps at each PONA, guidance solutions can be integrated based on an initial state and costate (these solutions are called forward sweeps). The guidance solutions thus generated are candidate solutions parameterized by the initial costate, which leaves the problem of finding the optimal initial costate (giving the optimal guidance control).

The state vector for the pursuer is $x=(x_m,y_m,\gamma_m)$ with equations of motion $$\dot{x}_m = V_m \cos\gamma_m \tag{27}$$

$$\dot{y}_m = V_m \sin\gamma_m \tag{28}$$

$$\dot{\gamma}_m = u \tag{29}$$

$(x_m,y_m)$ is the location, $v_m$ is the constant speed, and $\gamma_m$ is the direction of flight of the pursuer.

The main aim is for the pursuer to fly over a target on the ground while avoiding various obstacles or dangerous zones in the x-y plane. This can be used to give a range of scenarios with increasing difficulty.

This example is sufficiently difficult to not have a tractable closed-form solution, even in the simple case of flying over a fixed target in open ground, and has the potential to have forward sweeps that have many oscillatory solutions that are for from optimal for the case in hand. For a single target $\omega_i \in \Omega$ the cost function is taken to be of the form $$J(\omega_i) = 0.5 g(m^2(\omega_i)) + \int_{t_0}^{t_f} B(x,t) + 0.5 u^2 \, dt \tag{30}$$

The cost function has been normalized by dividing through with a constant to give unit cost gain due to applying the control u. $m(\omega_i)$ is the minimum distance to the target before the end of flight or the projected miss distance. However, this cost should be saturated to be more realistic and give better results, so we use the more general cost function $0.5\,g(m^2(\omega_i))$ of miss distance, where g saturates. B represents the strength of the danger zones (or preferred paths if negative). Let $z_M=(x_m,y_m)$ be the position of the pursuer and $z_T^{(i)}$ be the position of the target particle i. Then the "miss" part of the cost function is given as the weighted distance squared at PONA $$\phi^{(i)}=\phi(x,y^{(i)})=0.5g((z_M-z_T^{(i)})^T(z_M-z_T^{(i)}))|_{t_i} \tag{31}$$

and the PONA condition is given by $$\omega^{(i)}=\psi(x,y^{(i)},\dot{y}^{(i)})=(z_M-z_T^{(i)})^T(\dot{z}_M-\dot{z}_T^{(i)})|_{t_i}=0 \tag{32}$$

for each particle. Now this has the following property $$\frac{d\phi^{(i)}}{dt} = \frac{\partial g}{\partial m^2}(z_M - z_T^{(i)})\dot{z}_M - \frac{\partial g}{\partial m^2}(z_M - z_T^{(i)})\dot{z}_T \tag{33}$$

$$= \frac{\partial g}{\partial m^2}(z_M - z_T^{(i)})^T(\dot{z}_M - \dot{z}_T) \tag{34}$$

so $$\left.\frac{d\phi^{(i)}}{dt}\right|_{t_i} = 0 \tag{35}$$

as is expected at PONA. Now $$\frac{d\psi^{(i)}}{dt} = V^{(i)} + m^{(i)} u - (z_M - z_T^{(i)})\ddot{z}_T \tag{36}$$

where $$m^{(i)} = (z_M - z_T^{(i)})^T(-\sin\gamma_m, +\cos\gamma_m)V_m \tag{37}$$

$$V^{(i)} = (\dot{z}_M - \dot{z}_T^{(i)})^T(\dot{z}_M - \dot{z}_T) \tag{38}$$

Using the definition Eq. (15) together with Eqs. (31, 32) we get $$\frac{\partial \Phi^{(i)}}{\partial z_M} = \left(\frac{\partial g}{\partial m^2}(z_M - z_T^{(i)}) + v^{(i)}(\dot{z}_M - \dot{z}_T^{(i)})\right)^T\bigg|_{t_i} \tag{39}$$

$$\frac{\partial \Phi^{(i)}}{\partial \gamma_m} = v^{(i)}(z_M - z_T^{(i)})^T(-\sin\gamma_m, \cos\gamma_m)V_m\bigg| = v^{(i)}m^{(i)} \tag{40}$$

Using these identities, the incremental update as a function of $v_i$ can now be calculated from Eq. (26):

$$[\delta\lambda_x^{(i)}, \delta\lambda_y^{(i)}] = \frac{w_i}{n(+t_i)}\left\{-\frac{\partial g}{\partial m^2}(z_M - z_T^{(i)}) - v^{(i)}(\dot{z}_M - \dot{z}_T^{(i)}) + [\lambda_x, \lambda_y]\right\} \tag{41}$$

$$\delta\lambda_\gamma^{(i)} = \frac{\omega_i}{n(+t_i)}\{-v^{(i)}m^{(i)} + \lambda_\gamma^{(i)}\} \tag{42}$$

Substituting equation of motion Eq. (27) to Eq. (29) into Eq. (24) and Eq. (30) gives the classic control law in terms of the co-state:

$$u=-\lambda_\gamma \tag{43}$$

Hence the candidate guidance solutions are parameterised by the co-state function, as indicated above. Furthermore, as the pursuer passes the PONA of each target trajectory, the steps in the costate function correspond to altering the guidance control; hence the projected trajectory for the initial guidance solution is altered once each PONA is passed, to take into account the possible target trajectory that has been passed.

The next step is to calculate $v^{(i)}$ in terms of costates $\lambda=(\lambda_x, \lambda_y,\lambda_\gamma)$ and pursuer states so that the costate dynamics given by Eq. (21) can be integrated up (using a forward sweep). This process of integrating up the costate trajectory corresponds, by virtue of Eq. (43) to determining the projected trajectory for the candidate guidance control.

Superficially, from Eq. (20) and the orthogonality condition Eq. (35), we get $$v^{(i)} = -\frac{Q(t_i)}{w_i \frac{d\psi^{(i)}}{dt}} \tag{44}$$

However, $Q(t_i)$ depends on the jump $\delta_{(i)}u=u(t_i-)-u(t_i+)$ which in turn depends on $v^{(i)}$. In fact using the control law Eq. (43), the definition of L given in Eq. (30) and the definition Eq. (18), and casting everything in terms of $\delta\lambda$ we have:

$$Q(t_i)=+w_i\{B+0.5\lambda_\gamma^2\}-n(t_i+)\{0.5\delta\lambda_\gamma^{(i)}+\lambda_\gamma\}\delta\lambda_\gamma^{(i)} \tag{45}$$

Eqn. (45) is nearly linear, assuming the jumps at $t_i$ are comparatively small. Going back to Eq. (44) and bringing the denominator back up over to the left we get on substituting Eq. (45)

$$v^{(i)}w_i\frac{d\psi^{(i)}}{dt} = -w_i\{B + 0.5\lambda_\gamma^2\} + n(t_i+)\{0.5\delta\lambda_\gamma^{(i)} + \lambda_\gamma\}\delta\lambda_\gamma^{(i)} \tag{46}$$

Now substitute Eq. (42) to give $$v^{(i)} w_i \left\{ \frac{d\psi^{(i)}}{dt} + m\lambda_\gamma \right\} = w_i \{-B + 0.5\lambda_\gamma^2\} + 0.5n(t_i +)[\delta\lambda_\gamma^{(i)}]^2 \quad (47)$$

Substituting from Eq. (36) and rearranging we get $$v^{(i)} = D^{-1}\left(-B + 0.5\lambda_\gamma^2 + 0.5\frac{n(t_{(i)} +)}{w_i}[\delta\lambda_\gamma^i]^2\right) \quad (48)$$

$$D = V^{(i)} + m^{(i)}u - (z_M - z_T^{(i)})\dot{z}_T + m^{(i)}\lambda_\gamma \quad (49)$$
$$= V^{(i)} - (z_M - z_T^{(i)})\dot{z}_T$$

The second order term $[\delta\lambda_\gamma^{(i)}]^2$ still a function of $v^{(i)}$ which could be accounted for by substituting in Eq. (42); however, the implementation recognizes that this is a small second order term so an approximate value is used by first using Eq. (48) with $\delta\lambda_\gamma^{(i)}=0$, and then using this first approximation for $v^{(i)}$ in Eq. (42), to give a better approximation for $\delta\lambda_\gamma^{(i)}$, which is then used in Eq. (48) to give the final approximation to $v^{(i)}$. This is then used to give $\delta\lambda$ from Eqs. (41) and (42).

Following this procedure and using a guessed initial value for the costate, the algorithm sweeps forward integrating Eq. (21) until a PONA is detected for a particle in the particle filter (i.e. the closest target trajectory). At that stage, $v^{(i)}$ is computed and the jumps in the costate $\delta\lambda$ are calculated in the way given in this section: This process is continued until all particles in the particle filter are accounted for (i.e. the PONAs of all targets have been passed).

The following gives a general method to use for computing the $\delta\lambda^{(i)}$ at a PONA. In the general case, the condition $$\psi(x,y^{(i)},\dot{y}^{(i)})|_{t_p(\omega)} = 0$$

is the point of nearest approach in the sense that the cost function $\phi$ achieves a local minimum (maximum) so its rate of change is zero as a function of time, thus $$\left.\frac{d\phi^{(i)}}{dt}\right|_{t_i} = 0$$

at PONA.

Equations (20) and (15) therefore give us that $$v^{(i)} = -\frac{Q(t_i)}{w_i \frac{d\psi^{(i)}}{dt}}$$

The expression on the right in the above is a known function of guidance state x and time on the denominator but the numerator is a function of the control u and its jump as well as the state x and time at PONA. The time and state are continuous at a PONA but u is not. From equation (24) by substitution of the known values of L and f from equations (1) and (3) we get u as a function of $\lambda$ as well as the known values of state x and time at PONA. By substituting we get $v^{(i)}$ as a function of the unknown $\delta\lambda^{(i)}$ then by substitution we get from equation (15)

$$\left.\frac{\partial\Phi^{(i)}}{\partial x}\right|_{t=t_i-}$$

as a function of $\delta\lambda^{(i)}$. Substituting this into equation (26) gives a derivable relation $$\delta\lambda^{(i)} = F_i(\delta\lambda^{(i)}) \quad (A1)$$

In practice the cost functions will be chosen so that $F_i()$ is a function that can be derived as an algebraic expression of state and time. However this does not preclude evaluation of it numerically. The solution to this equation (A1) will then give the jump in the costates. This can be solved by a general numerical method such as the Newton-Raphson method (published for example by Cambridge University Press 1988 as. "Numerical Recipes in C". Section 9.3 by William H. Press et al). Alternatively the equation can often be approximated by a linear equation to give an initial solution $\delta\lambda^{(i)}_n$, and then applying $\delta\lambda^{(i)}_{n+1} = F_i(\delta\lambda^{(i)}_n)$ to get a better solution $\delta\lambda^{(i)}_{n+1}$. This will converge to a solution if $F_i()$ is a contraction near the solution. In practice this is the case and a reasonable solution can be obtained with a single iteration. The practitioner will of course include code to check for this by looking at the change in the solution with each substitution. If convergence is not apparent then the more expensive Newton-Raphson method can always be used.

The size of the jump decreases with the number of candidate target tracks which can be increased if the simple method does not converge quickly by increasing the Particle Filter sample size. In this sense the jumps are an artefact of the Particle Filter approximation.

The method described so far provides a method of determining for a given candidate guidance control a projected trajectory that takes into account the PONA of each target trajectory. It also allows a cost to be recorded for each candidate guidance control (for example by using Eq. 9), the cost being based on the projected trajectory and the miss distances at the PONA of each target trajectory. The next stage is to determine the optimal guidance control from the space of possible guidance controls, in view of the calculated costs.

The optimization problem has many local minima, and so hill climbing to a solution is not robust. However, an area of search can be defined to look for a solution, and a randomized search algorithm that has a good search coverage and converges to a global minimum in the search area with high probability has been identified. A swarming optimizer that searches several locations at once, described by J Kennedy and R Eberhart ("Particle swarm optimization", in *Proceedings of the IEEE International Conference on Neural Networks* (Perth, Australia), volume IV, pages 1941-1948, Piscataway, Piscataway, N.J., 1995: IEEE Service Centre) is used together with an extension based on the "Master-Slave" algorithm described by Bo Yang, Yunping Chen, Zunlian Zhao, and Qiye Han ("A master-slave particle swarm optimization algorithm for solving constrained optimization problems", in *Proceedings of the 6th World Congress on Intelligent Control and Automation*, Dalian, China, June 2006) that adaptively finds constraint cost weights for an optimization solution subject to pursuer state constraints. This is used to take into account no-go areas for the pursuer in dynamic mission planning, as described further below.

In swarm optimisation, candidate solutions are represented by swarm particles, which are particular points in the solution space of the problem of interest (i.e. points in an N-dimensional space, with co-ordinates given by N parameters that together characterise the solution). Each particle has a velocity vector, which indicates how its position in the solution space will change in the next iteration. Thus the candidate solution particles "fly" through the solution space from iteration to iteration. The direction of flight is determined by two factors: the best previous location of the particle, and the best previous location amongst all of the particles; it is the latter factor that can result in "swarming" behaviour, as the particles head towards the optimal solution (in terms of the calculated cost). The effectiveness of the algorithm can be improved by periodically substituting new solutions in place of poorly performing solutions.

The original optimization swarm algorithm developed by Kennedy and Eberhart has been modified to give the standard algorithm as follows, where we have a cost function f(x) of a parameter vector x that we wish to minimize.

Thus, swarm optimization starts by randomly selecting candidate swarm particle parameters, $x^{[j]}$ for particles j=1 ... $N_s$. Typically $N_s$=40. Each particle keeps a record of its personal best score parameter $p^{[j]}$ so far and current update velocity $v^{[j]}$. Initially the update velocities are set to zero. Let g be the current global best score parameter. A new generation of swarm particles is produced using the update rule:

$$v^{[j]} \to \text{Limit}(w^{[j]} \cdot v^{[j]} + K_1\{\text{rand}_1^{[j]}(p^{[j]} - x^j) + \text{rand}_2^j (g - x^{[j]})\}) \quad (51)$$

$$x^{[j]} \to v^{[j]} + x^{[j]} \quad (52)$$

followed by an update of the personal best parameter $p^{[j]}$ and global best parameter g. $\text{rand}_1^{[j]}$ and $\text{rand}_2^{[j]}$ are vectors of random numbers with components uniformly distributed in the interval [0,1]. These random vectors are multiplied component wise with the vectors in the expression. $K_1$ is a tuning constant normally set to 2 so that the update places the next guess around the area of personal best and global best when the previous velocity is small. $w^{[j]}$ is referred to as an inertia term and is included to combat the tendency for the swarm to prematurely collapse to a single point. In a swarm one needs to let some members move with small inertia to speed up convergence while other swarm members retain large inertias to encourage them to explore regions away from the current best score case and increase the chance of finding improved solutions. To do this $w^{[j]}$ is randomly selected for each particle at each update from the uniform distribution in the interval [0.5,1.5]. The function Limit( ) limits the velocity to ensure that the search does not charge-up large update changes that cause the affected particles to miss too many cases of improved score. In fact, this limit controls the spread of searching about the global minimum for the given distribution of distribution $w^{[j]}$.

This standard optimizing swarm does not provide any ability to include directly a constraint and the constraint is often honoured by applying a high cost for constraint violation. Instead of this, the algorithm used in this example embodiment uses the Master Slave algorithm now described.

The constraints are represented by functions of parameter vector $c_k(x)$ with k=1 ... $N_c$ and the feasible set is given by $$F = \{x | c_k(x) \le 0 \forall k = 1 \ldots N_c\}$$

To incorporate constraints into a cost function construct an auxiliary constraint function $$d_k(x) = \begin{cases} 0 & \text{if } c_k(x) \le \le 0 \\ c_k(x) & \text{otherwise} \end{cases} \quad (54)$$

and an augmented cost penalty $$\Theta(x) = f(x) + \sum_k \mu_k d_k(x) \quad (55)$$

where $\mu_k > 0$ are to-be-determined positive constraint penalty weights. Note that for a feasible point $\Theta(x) = f(x)$ and $\mu_k$ and $\mu_k$ can be in principle chosen to force any global minimum of $\Theta(x)$ to be in the feasible set. The Master Slave algorithm idea used by Yang et al. does better than that, by encouraging the swarm to look at constraint boundaries for candidate solutions to the constraint optimization problem. The Master Slave algorithm is used to find a cost minimum of f(x) subject to the constraint $x \in F$.

The master slave algorithm splits the swarm equally into a master swarm M and a slave swarm S. The candidate solution particles in the master swarm explore the feasible regions of the solution space; the candidate solution particles in the slave swarm explore the infeasible regions of the solution space. Solution particles from each swarm can change type, master becoming slave, and vice versa, if their flight path takes them across a constraint boundary: that allows the swarm as a whole to spread into regions that would otherwise (i.e. if there were only the master swarm) be closed to it by "no-go" constraint areas.

Thus the master swarm has an ordering relation $<_M$ that favours feasible solutions and small cost (for a master parameter pair (x, y) $x <_M y$ means x scores better than y.) The relation is defined as follows:

$$x <_M y = (x \in F \land y \in F \land f(x) < f(y)) \lor (x \in F \land y \notin F) \lor (x \notin F \land y \notin F \land \Theta(x) < \Theta(y)) \quad (56)$$

where $\land$ is the predicate and operator, $\lor$ is the predicate or operator, and $\neg$ used below is the predicate not operator. Similarly, the slave swarms have an ordering relation $<_S$ that favours infeasible solutions and small augmented cost. (For a slave parameter pair (x,y) $x <_S y$ means x scores better than y.) The relation is defined as follows:

$$x <_S y = (x \in F \land y \in F \land f(x) < f(y)) \lor (x \notin F \land y \in F) \lor (x \notin F \land y \notin F \land \Theta(x) < \Theta(y))$$

If a parameter x has components $x_i$, then put $$\text{dist}(x) = \sum_i |x_i|;$$

this will be used to measure the distance between two parameters x, y as dist(x−y).

Half of the master swarm consists of members called ML that are candidates to act as leaders for the master swarm and similarly half of the slave swarm members are called SL and are candidates to act as slave leaders. The idea of adopting a leader other than the global best is required because the master swam and slave swarm have different aims; also, by having a large number of leaders several local candidate competing solutions can better explored avoiding premature adoption of a local best that is not optimal. The basic idea of the algorithm is that each swarm member $i \in M \cup S$ maintains both a personal best parameter $p^{[j]}$, a current search parameter $x^{[j]}$ and a velocity $v^{[j]}$. For i, j∈M, define the relations $i <_M j = p^{[i]} <_M p^{[j]}$ $i \le_M j = \neg (j <_M i)$. For i, j∈S define the relations $i <_S j = p^{[i]} \le_S j = \neg (j <_S i)$.

At initialization, $\mu_k=1$, $k=1 \ldots N_c$ and $v^{[j]}=0$, $j \in M \cup S$ then the example algorithm iterates as follows:

1. Update the values of $\Theta(p^{[j]})$, $j \in M \cup S$
2. For the slaves, sort using the relation $<_M$ and use the top scoring half as the current SL. (This also orders the current slave leader set so that the worst scoring one can be found.)
3. Now process the masters $j \in M$ as follows:
   (a) Find the $i \in ML$ such that $dist(p^{[j]}-p^{[i]})=\min_{k \in ML}(dist(p^{[j]}-p^{[k]}))$
   (b) Update the search parameter in a similar way to the standard swarm optimizing algorithm:

$$v^{[j]} \to \text{Limit}(w^{[j]} \cdot v^{[j]} + K_1\{rand_1^{[j]}(p^{[j]}-x^{[j]}) + rand_2^{[j]}(p^{[i]}-x^{[j]})\}) \qquad (58)$$

$$x^{[j]} \to v^{[j]} + x^{[j]} \qquad (59)$$

(c) Evaluate the associated cost $\Theta(x^{[j]})$.
   (d) if $x^{[j]} \in F$ and $x^{[j]} <_M p^{[j]}$ set $p^{[j]} \to x^{[j]}$
   (e) if $x^{[j]} \notin F$ then an interesting thing happens. Let $w \in SL$ be the worst scoring slave leader in the sense that $w <_S k$ is never true for $k \in S$ then we effectively replace $w$ with $j$ in the following sense: $p^{[w]} \to x^{[j]} x^{[w]} \to x^{[j]} v^{[w]} \to v^{[j]}$. This makes $j$ that crosses the feasibility boundary to become infeasible spawn a slave leader while still staying as a master leader with a good personal best. The idea is that this new slave leader will most likely be close to the feasibility boundary and will lead other slaves back to produce good scoring masters that are feasible. The ordering $<_S$ ensures that infeasible slaves with minimal $\Theta$ cost are preferred to be in the slave leader group. After modifying $w$ the slaves are reordered using $<_S$ and the first half of the slave population are marked as slave leaders.

4. Once all masters have been processed the slaves are in turn processed as follows for each $j \in S$:
   (a) First ensure the slave leaders are the best half of the slave population using the relation $<_S$.
   (b) Find the $i \in SL$ such that $dist(p^{[j]}-p^{[i]})=\min_{k \in SL}(dist(p^{[j]}-p^{[k]}))$
   (c) Update the search parameter in a similar way to the standard swarm optimizing algorithm $$v^{[j]} \to \text{Limit}(w^{[j]} \cdot v^{[j]} + K_1\{rand_1^{[j]}(p^{[j]}-x^{[j]}) + rand_2^{[j]}(p^{[i]}-x^{[j]})\}) \qquad (60)$$

$$x^{[j]} \to v^{[j]} + x^{[j]} \qquad (61)$$

(d) Evaluate the associated cost $\Theta(x^{[j]})$.
   (e) if $x^{[j]} \notin F$ and $x^{[j]} <_M p^{[j]}$ set $p^{[j]} \to x^{[j]}$
   (f) If $x^{[j]} \notin F$ then choose the worst possible $w \in M$ using the relation $<_M$ and replace $w$ with $j$ in the following sense: $p^{[w]} \to x^{[j]} x^{[w]} \to x^{[j]} v^{[w]} \to v^{[j]}$. In this way good slave leaders that are close to the feasibility boundary can spawn better masters. It is possible that a good scoring master away from the boundary can give a global optimum so there is no need to only replace master leaders that are likely to have been spawned from a slave in preference to masters in general.

After replacement of each $w \in M$ the master leaders are found using the relation $<_M$.

5. Following the processing of each slave the constraint weights are recalculated to ensure that there are no high scoring infeasible points away from the feasibility boundary. Let $g \in ML$ be the global best, that is $g \leq_M i$ for all $i \in ML$.
   (a) If $g \notin F$ there is no feasible case of use and so the constraint weights are doubled to encourage the choice of feasible points: $\mu_k \to 2\mu_k$.
   (b) if $g \notin F$ then the constraint weights are adjusted to ensure that $$C1: s \in S \cap \bar{F} \Rightarrow \Theta(p^{[s]}) \geq f(p^{[g]}) \qquad (62)$$

and the weights are reduced if there is too much slack. This is done as follows:

i. Initialize by setting ok→true and α→1. ok is true if no case has been found to violate condition C1. α is used to calculate the slack in the constraint weights.

ii. If $f(p^{[s]}) \geq f(p^{[g]})$ then condition C1 is automatically satisfied since $\Theta(x) \geq f(x)$.

iii. For each $s \in S \cap \bar{F} | f(p^{[s]}) < f(p^{[g]})$ do the following:
   A. Put $\Delta_1^s \to \Theta(p^{[s]}) - f(p^{[g]})$
   B. If $\Delta_1^s < 0$ set ok→false then find the $k$ to give $d_k(p^{[s]}) = \max_{j=1 \ldots N_c}(d_j(p^{[s]}))$ this maximum is non zero so we can set $\mu_k \to \mu_k + |\Delta_1^s|/d_k(p^{[s]})$ this increases $\Phi(p^{[s]})$ so that the condition C1 is just satisfied.
   C. If $(\Delta_1^s \geq 0) \wedge$ ok then we can calculate the slack as $$\alpha^s = \frac{f(p^{[g]}) - f(p^{[s]})}{\Theta(p^{[s]}) - f(p^{[s]})} \qquad (63)$$

This has to be a positive non zero number and we put $\alpha \to \min(\alpha, \alpha^s)$ this ensures that if we put $\mu_k \to \alpha \mu_k$ and recalculate the augmented cost $\Theta(x)$ then condition C1 is still satisfied in the case that ok remains true.

iv. After processing all $s \in S \cap \bar{F} | f(p^{[s]}) < f(p^{[g]})$, check to see if ok remains true and if so reduce the constraint weights by half of the slack, by putting $\mu_k \to 0.5(1+\alpha)\mu_k$.

This completes the description of the algorithm for a single iteration step.

As can be seen the algorithm uses master and slave leaders to feed each other in a way that encourages the master and slaves to congregate at optimum feasibility boundary in the case that the feasibility constraints constrain the global maximum. Also the algorithm does enable two competing solutions to be explored at the same time by using nearest leaders instead of a global best to lead the master and slave swarms. Furthermore the algorithm adjusts the constraint weights to ensure that the slaves do not have a global minimum away from the feasibility boundary.

By using a fixed list of $N_s+1$ swarm candidates, the implementation ensures the algorithm does not produce memory management inefficiencies. The spare one is called a parked swarm particle which is used to generate new test cases at the update phase and the swarm particles are referenced by an array of pointers. The position of the reference in the array determines if we are dealing with a slave, master, or parked swarm particle. The implementation also ensures that the global best master is always at the beginning of this reference array heading the sub-array of masters so that it is easy to pick out the best one for guidance commands.

One major problem with using a forward sweep method which starts with a guessed costate and integrates forward to give predicted guidance is that this tends to give highly convoluted solutions that are far from optimal and thus a waste of effort. Since a separate optimization algorithm only needs the forward sweep to be accurate close to the optimal solution one can introduce modifications in the differential equations to stop off track solutions from curling up and giving a useless initial guess of the optimal.

To achieve uncurling the costate equation is modified to give $$\dot{\lambda}_\gamma = -\frac{\partial B}{\partial \gamma_m} + \lambda_x V_m \sin\gamma_m - \lambda_y V_m \cos\gamma_m - V_m(\lambda_x^2 + \lambda_y^2)^{1/2} k_s \lambda_\gamma \qquad (64)$$

where $k_s$ is an iteration constant which decreases to zero with swarm iterations to finally give the correct solution.

To approximately analyze this assume that $\lambda_x$ and $\lambda_y$ are nearly constant and the boundary cost terms are weak then from Eq. (64) we get $$\ddot{\gamma} = -\dot{\lambda}_\gamma \quad (65)$$

$$\approx -A \sin(\gamma_m - \gamma_0) - A k_s \dot{\gamma}_m \quad (66)$$

where $$\lambda_x \equiv A \cos(\gamma_0) \quad (67)$$

$$\lambda_y \equiv A \sin(\gamma_0) \quad (68)$$

$$\Rightarrow A = V_m (\lambda_x^2 + \lambda_y^2)^{1/2} \quad (69)$$

by comparison with the original equation. Linearising we get $$\ddot{\gamma}_m + A k_s \dot{\gamma}_m + A(\gamma_m - \gamma_0) = 0 \quad (70)$$

which is a linear second order system with natural frequency $$\omega = \sqrt{A} \quad (71)$$

and damping $$\zeta = k_s \frac{\sqrt{A}}{2} \quad (72)$$

Typically $k_s$ is initialized to 1 and is reduced exponentially to zero with a time constant of 50 swarm iterations. In this way, high frequency oscillations in the optimization ODE are initial heavily damped out in preference to low frequency oscillations to encourage solutions that are more likely to be optimal, as the iterations continue the high frequency oscillations are allowed in by the relaxation of $k_s$ when the algorithm has converged and is not likely to introduce wild non-optimal oscillations. It can also be seen that the effect of the environmental cost function B is to change the frequency of oscillation due to gradients in $x_m$ and $y_m$ and provide a forcing function to perturb the system if B has a gradient in $\gamma_m$.

We now look at some implementation issues when applied to a dynamic planning example and look at some results. This shows some interesting emergent properties such as covering two possible outcomes at different times to go.

The dynamic mission planning example based on the equations developed above is in a 10 km×10 km area as shown for instance in FIG. 1. In the south is an airfield (not shown) where the pursuer 25 is launched against a target that starts in the central town and can emerge from the urban area in many directions. The pursuer is required to avoid no-go areas centred on a main clumping of urban areas and fly over the target while minimizing the projected ground miss distance and manoeuvring by the pursuer. The target is tracked by a ground-based tracker that measures range bearing and Doppler and discriminates the target from the background through Doppler. The radar station 35 is situated in the airfield and measures the target position every 10 s. A 10 s lag is also introduced from measurement and generating guidance output giving the system time to plan ahead a 300 s trajectory into the future (from the start time of the simulation). The radar has rms measurement accuracies of angle 8.5 mr, range 20 m, and Doppler 5 m/sec. For a Doppler greater than 2 m/sec, the tracker can measure angle and range of the target while, for Doppler less than this, it can only infer the position of the target by the Doppler measurement. The particle-based guidance plans forward to predict the best future trajectories using 5 iterations of the master-slave algorithm and a swarm of 40 optimizing test cases. This gives a set of predicted test costates which is used to initialize the next phase after a measurement and the best track is used to produce current navigation commands. The test trajectories are candidate optimal solutions and interact with the particle filter model of the target state using the equations derived above with the exception that the gradient near the no-go boundaries have been reversed to provide a more favourable set of trajectories. Using the correct sign tends to make the slightly off-track trajectories bounce off the no-go boundaries rather than hug them, which would be the case if the additional constraint equations were correctly represented. The computed trajectories are only used to provide viable alternatives to the master-slave optimizer and thus can always be modified using heuristics provided the important cost evaluation is not tampered with.

The target is in the example confined to travel on roads and is given second order dynamics with random input along the lines described by David Salmond, Martin Clark, Richard Vinter, and Simon Godsill ("Ground target modelling, tracking and prediction with road networks", technical report, the Defence Science and Technology Laboratory on behalf of the Controller of HMSO, 2007). The targets have dynamics that respect the nature of road junctions and will slow down on average if for instance a target meets a main road. The important thing is that an elaborate behavioural model which is non-Gaussian can easily be accommodated without significant change to the algorithm. The Particle Filter uses the standard Sampling Importance Resampling (SIR) filter described by Branko Ristic and Sanjeev Arulampalam in "Beyond the Kalman Filter (Particle Filters for Tracking Applications)", Artech House, 2004) using 1000 particles. The small number of particles is possible in this case because the target is restricted to roads and the guidance algorithm effectively averages over several particles.

The method employed by the processing apparatus in, for example, pursuer 25 or radar station 35 is set out as pseudocode in FIG. 13. The method can be considered a set of nested iterative loops. In the top-level loop (lines 10 to 150 of the pseudocode), a set of possible target locations (i.e. the target probability distribution) is provided (line 20), an optimal guidance control is calculated (lines 30 to 130), and the calculated optimal guidance control is applied to the vehicle (line 140). The vehicle then travels a distance along its real-world trajectory, according to the applied guidance control, before further observations of the target are made, and a revised set of possible target locations is thereby provided (returning to line 20). The loop is repeated until the vehicle reaches the target.

In the calculation of the optimal guidance control (lines 30 to 130), an optimisation loop is iterated for a predetermined number J of steps. In the optimisation loop, candidate guidance solutions are provided (line 40). Each candidate guidance solution is considered in turn (in a loop at lines 50 to 110), and a cost is calculated for each in a cost calculation loop (lines 60 to 90) and then recorded (line 100). Once all the candidate guidance solutions have been costed, an optimisation algorithm (in this example a master-slave swarming algorithm, as discussed above) is used to calculate a new set of candidate guidance solutions (line 120), which are used in the next iteration of the optimisation loop (i.e. from line 40).

In the cost loop (lines 60 to 90), the future trajectory of the vehicle being guided is calculated (line 70), for the candidate guidance solution, in this example by integration of the costate trajectory, in accordance with Eq. (21) above. As the PONA to each possible target trajectory is passed, the projected trajectory is adjusted to take into account the passed possible target trajectory (line 80), until the PONA to the final target trajectory is passed, at which point the cost for the candidate guidance solution under consideration is known.

Thus cost for the resultant trajectory of each candidate guidance solution is calculated, and the optimal guidance solution is determined by using an optimisation algorithm to optimise that cost.

The tracking of several potential targets spread out on a network of roads makes it difficult to appreciate the qualitative features of the tracking algorithm so a video of the internal processing laid out on the backdrop of roads and no-go areas was plotted and stored in an .avi file for replaying. FIG. 1 gives a snapshot of such a frame, annotated with additional comments. The sweep time is the internal predicted state time from the beginning of simulation. The Measurement time corresponds to the next measurement time. All output displays the state after 5 iterations of the master-slave algorithm where there are 20 masters and 20 slaves. The green lines 10 represent the personal best of the masters with the red track 20 representing the global best track prediction. The black track 30 represents the actual track taken so far by the vehicle/munition 25. The road network is represented by orange lines 40. The thick roads represent main roads where the target can move at faster average speeds. The no-go areas are represented by purple clockwise contours 50. The track of the target so far is represented by a light blue track 60, the actual target position synchronized with the sweep time is represented by a yellow circle 70, and the predicted target distribution is represented by dark blue dots 80.

Figure 2:
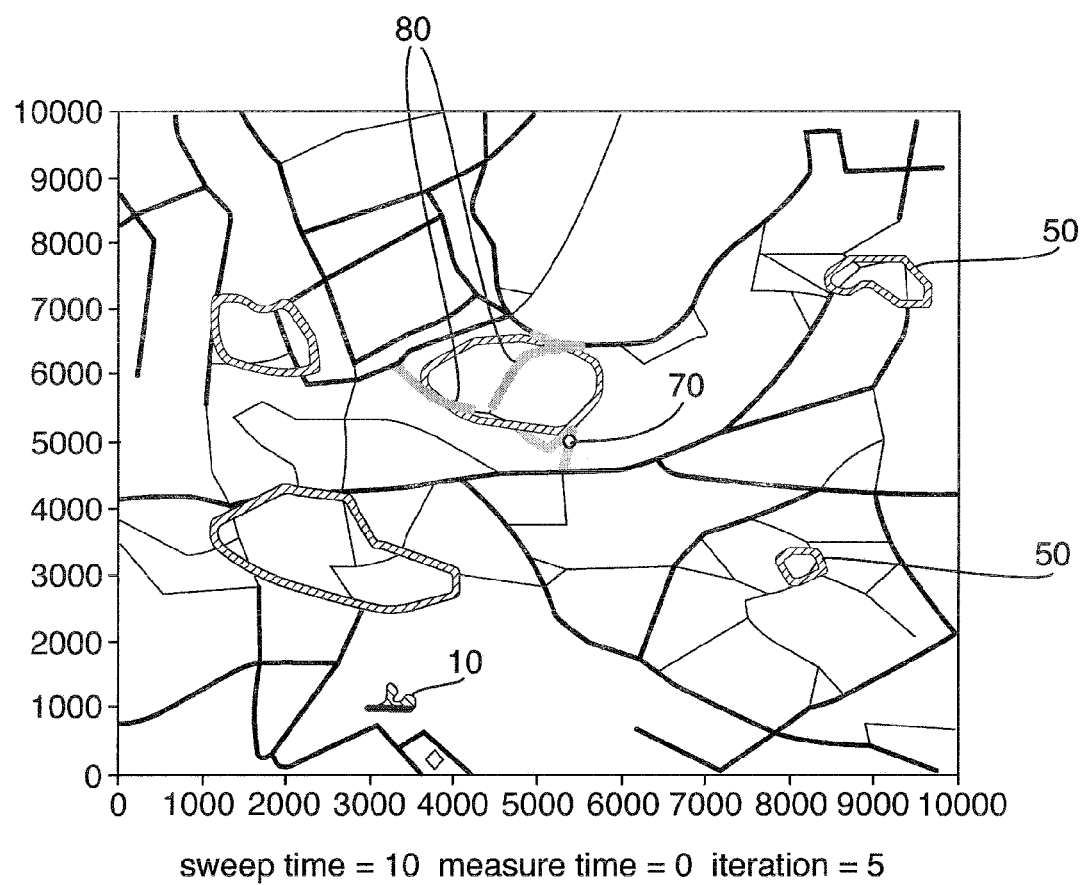
FIGS. 2 to 7 are further .avi file snapshots showing the output of the example method for a first example target.
Figure 3:
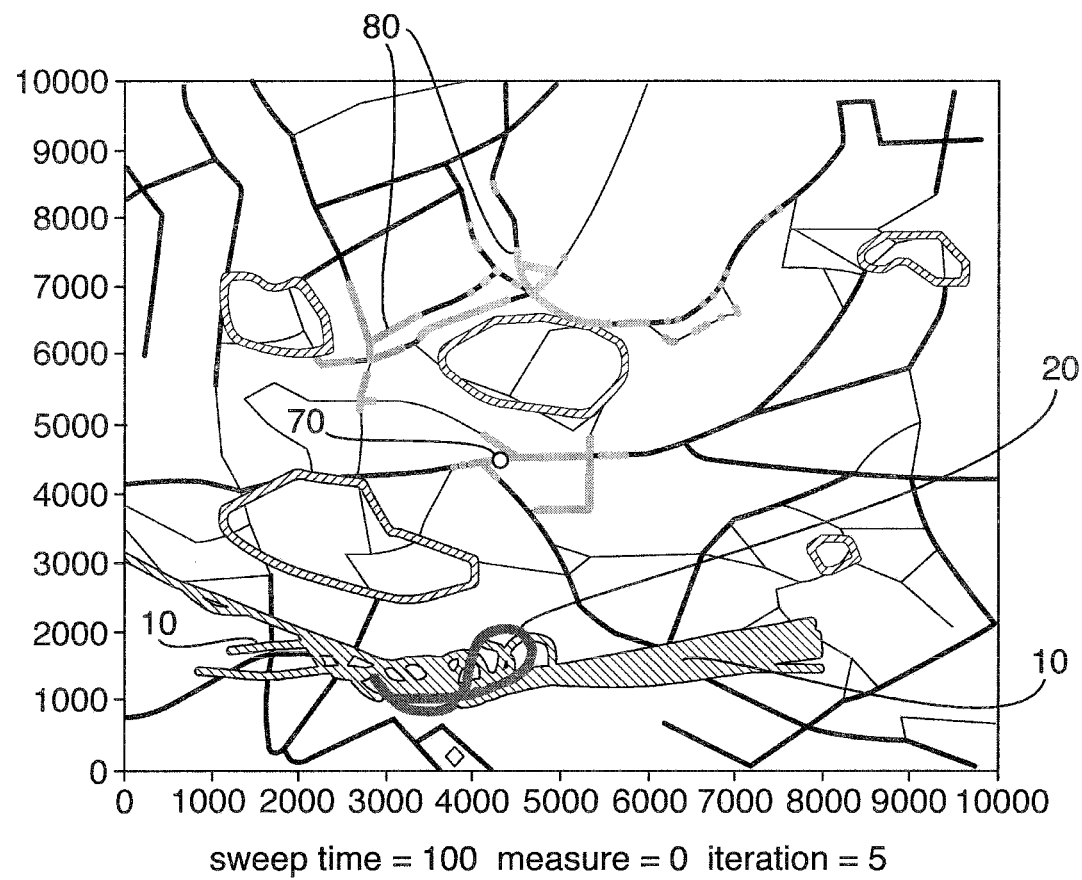

In Example Case 1, the target starts heading South as shown in FIG. 2, and is intercepted quite early. FIG. 3 shows the potential target distribution at this intercept time if there were no future measurements. However, the algorithm does not just take an average location of possible target positions resulting in flight directly into the no-go area. Note that the initial 5 steps in optimization have not converged to an optimal long-term solution but this has little effect in the actual path taken.

Figure 4:
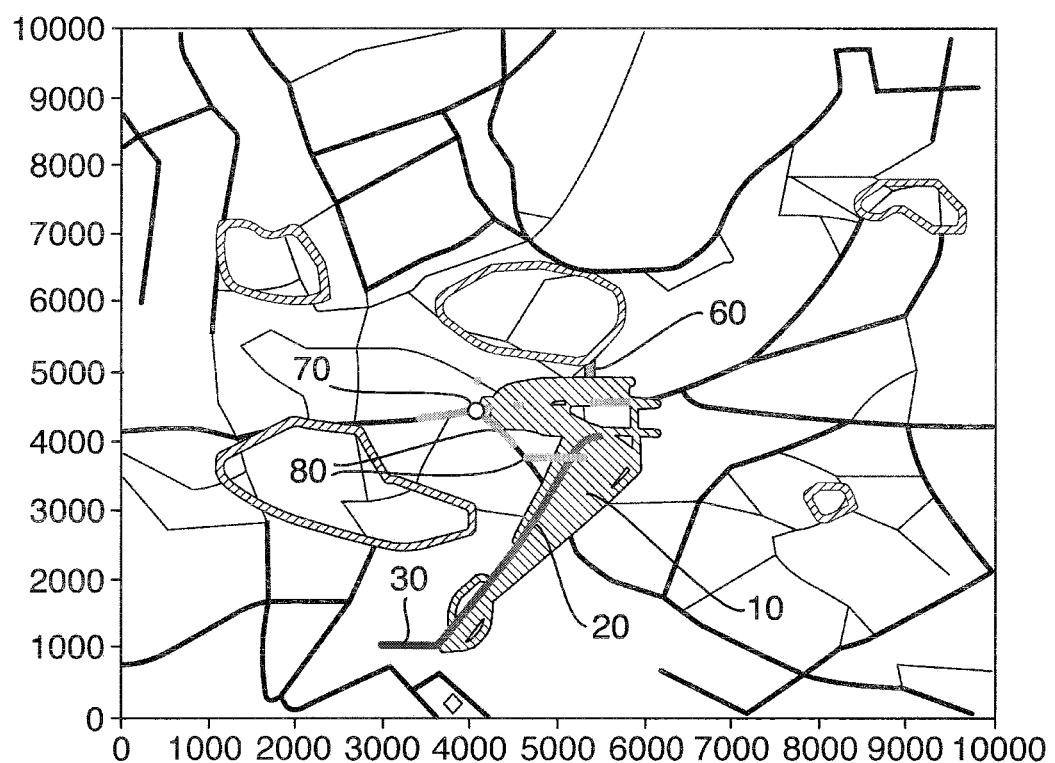
Figure 5:
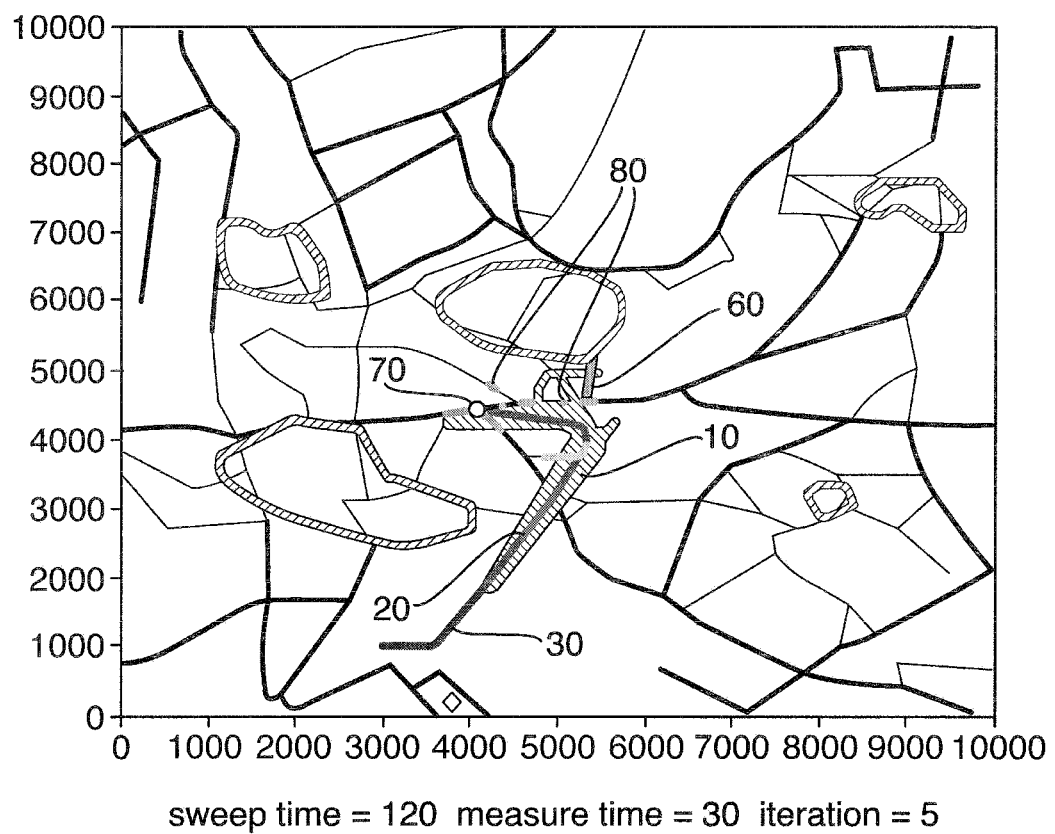

FIG. 4 shows a conflict of potential target routes and the planner starts to sort out the shortest time to go case first. This happens because the algorithm will tend to approximate when to choose a PONA. In FIG. 5 this is resolved into a dogleg that covers South going track and an East-West track.

Figure 6:
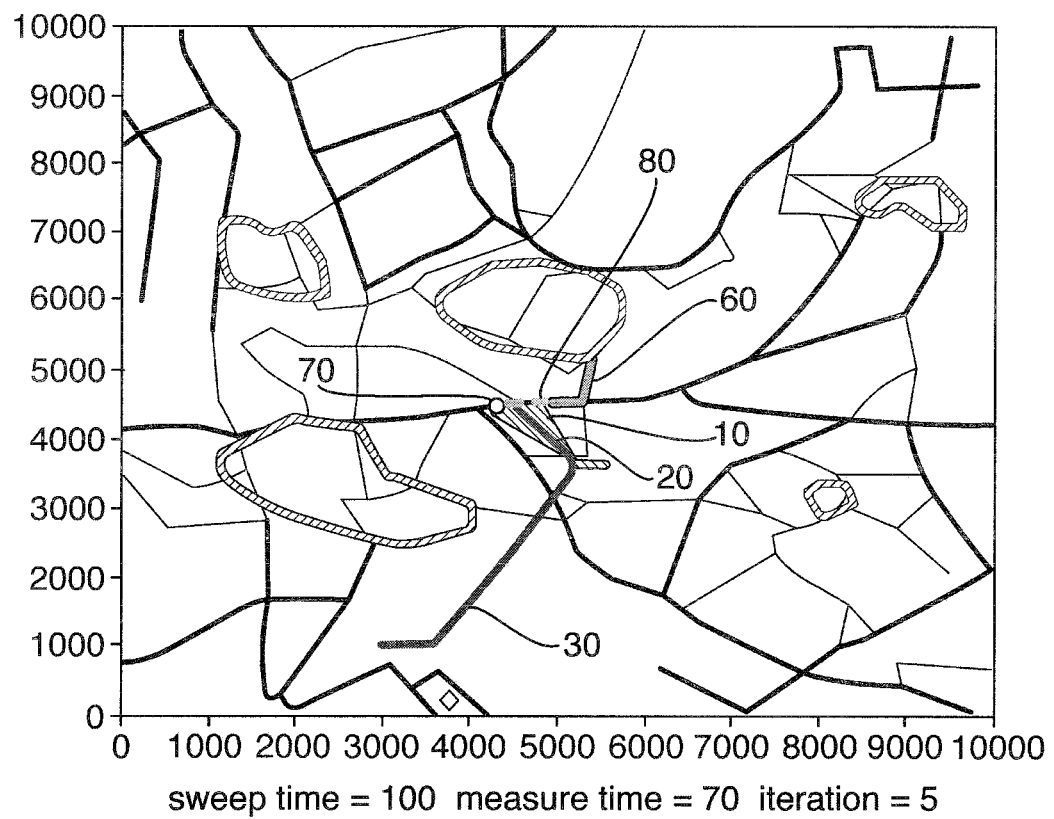
Figure 7:
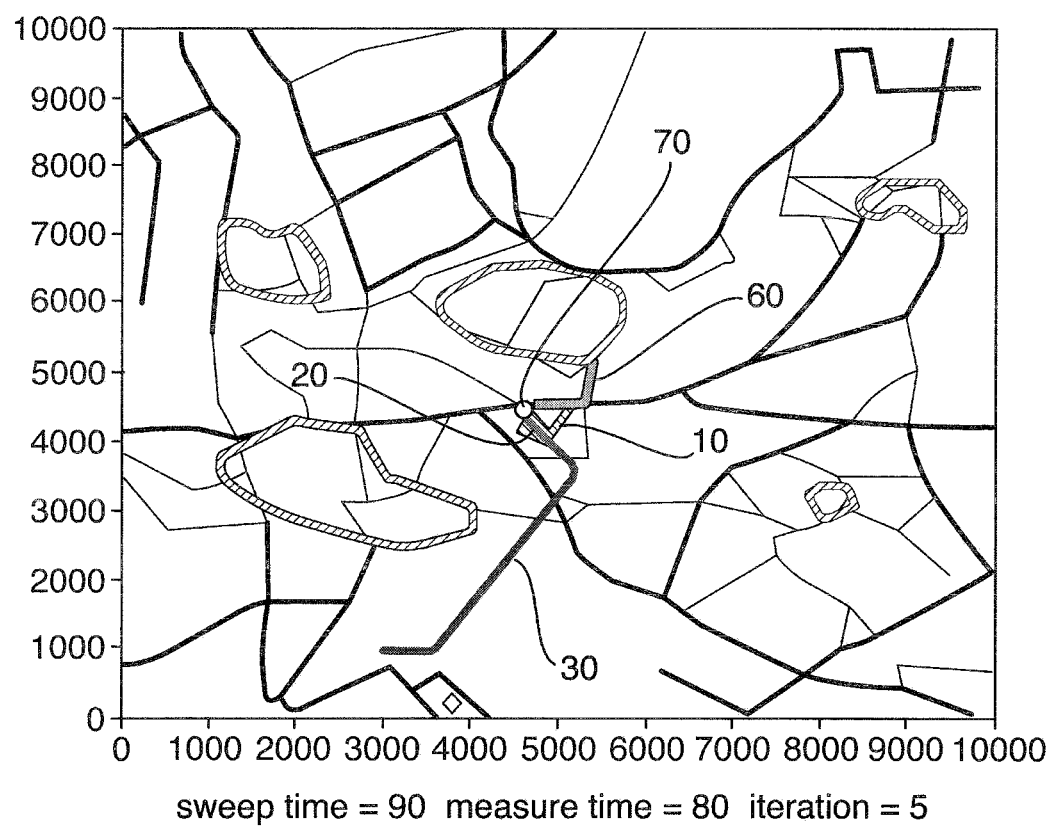

The South going track does not materialize and in FIG. 6 the planner concentrates on the East-West tracks. Finally in FIG. 7, the munition homes on to the target.

Figure 8:
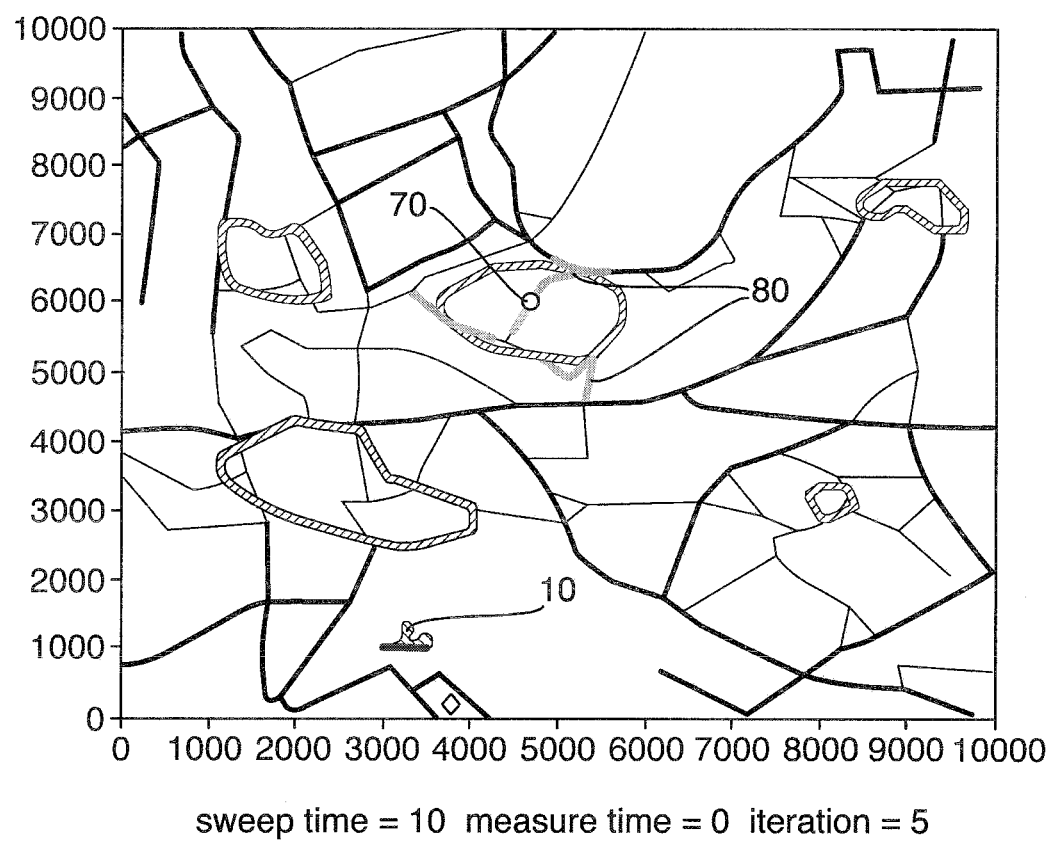
FIGS. 8 to 12 are further .avi file snapshots showing the output 1 of the example method for a second example target.
Figure 9:
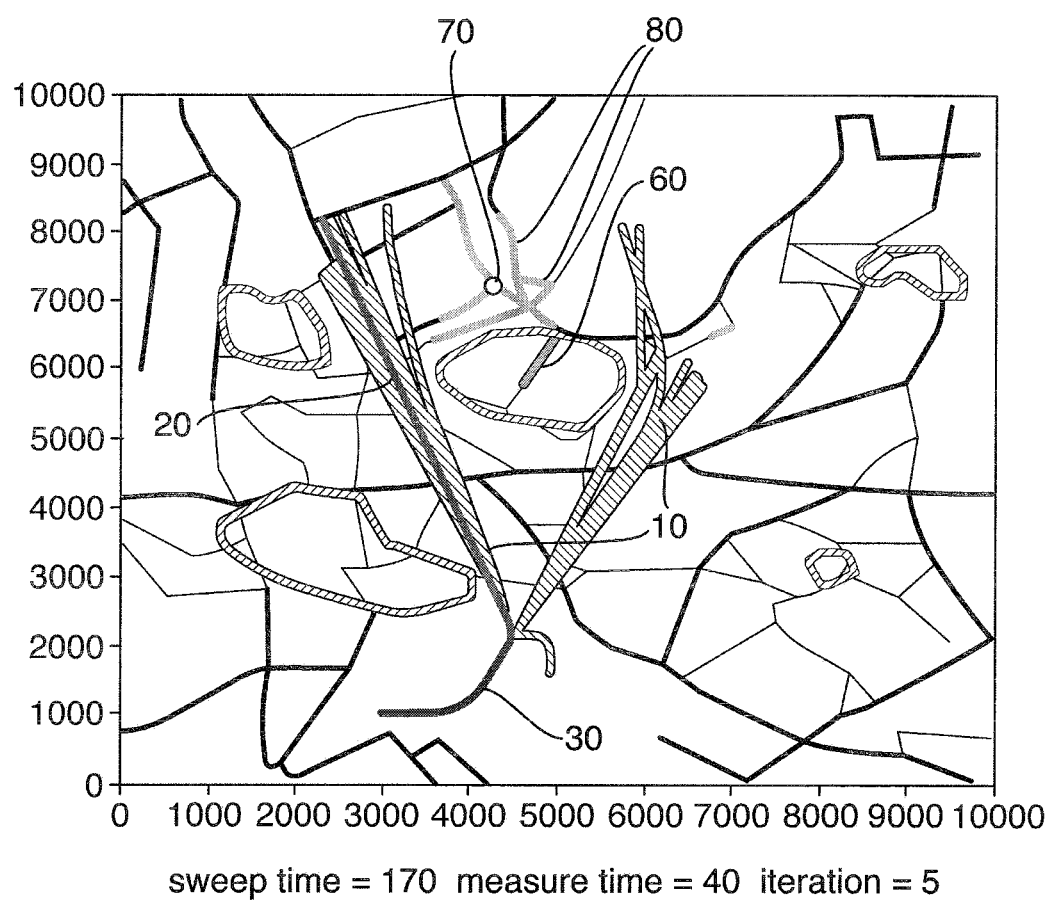

In Example Case 2, the target starts in the centre of the no-go zone as shown in FIG. 8 and finally emerges at the top heading North West. In FIG. 9 the planner explores two options and decides to go to the West of the no-go area. This case shows how the solutions can bifurcate.

Figure 10:
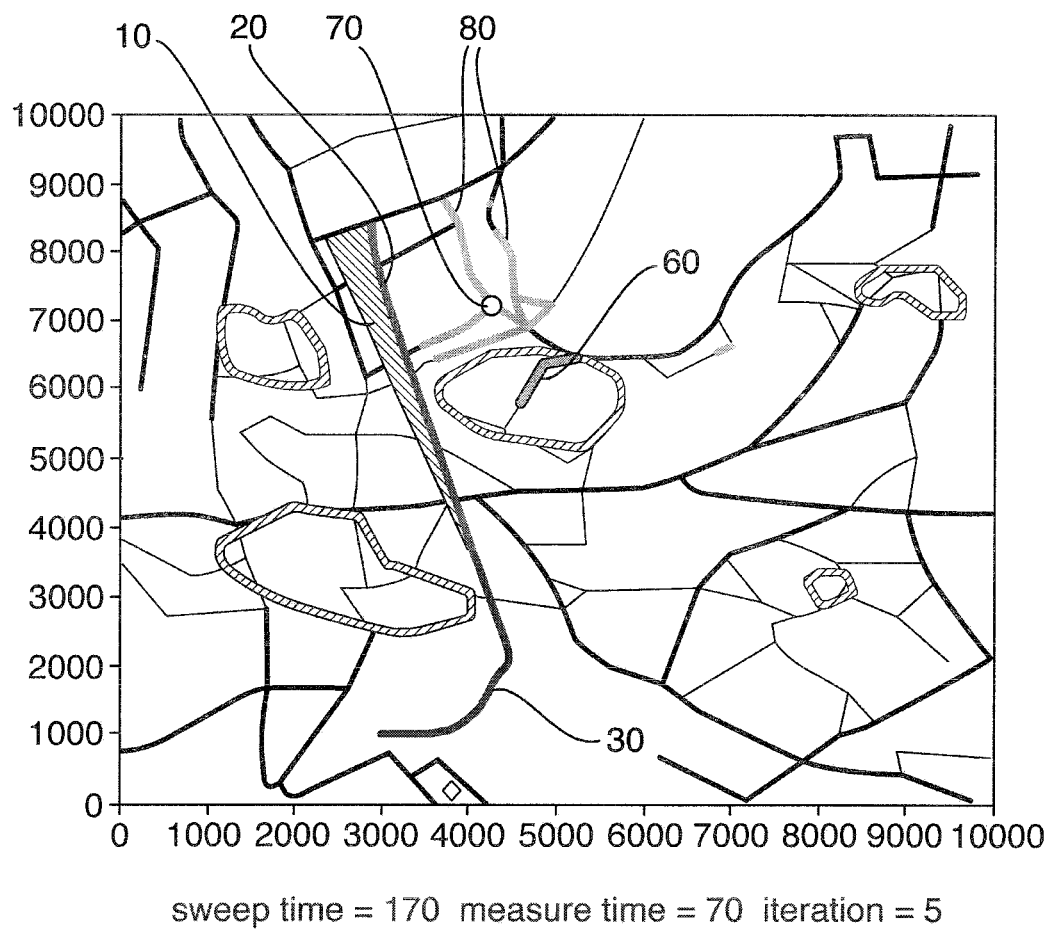
Figure 11:
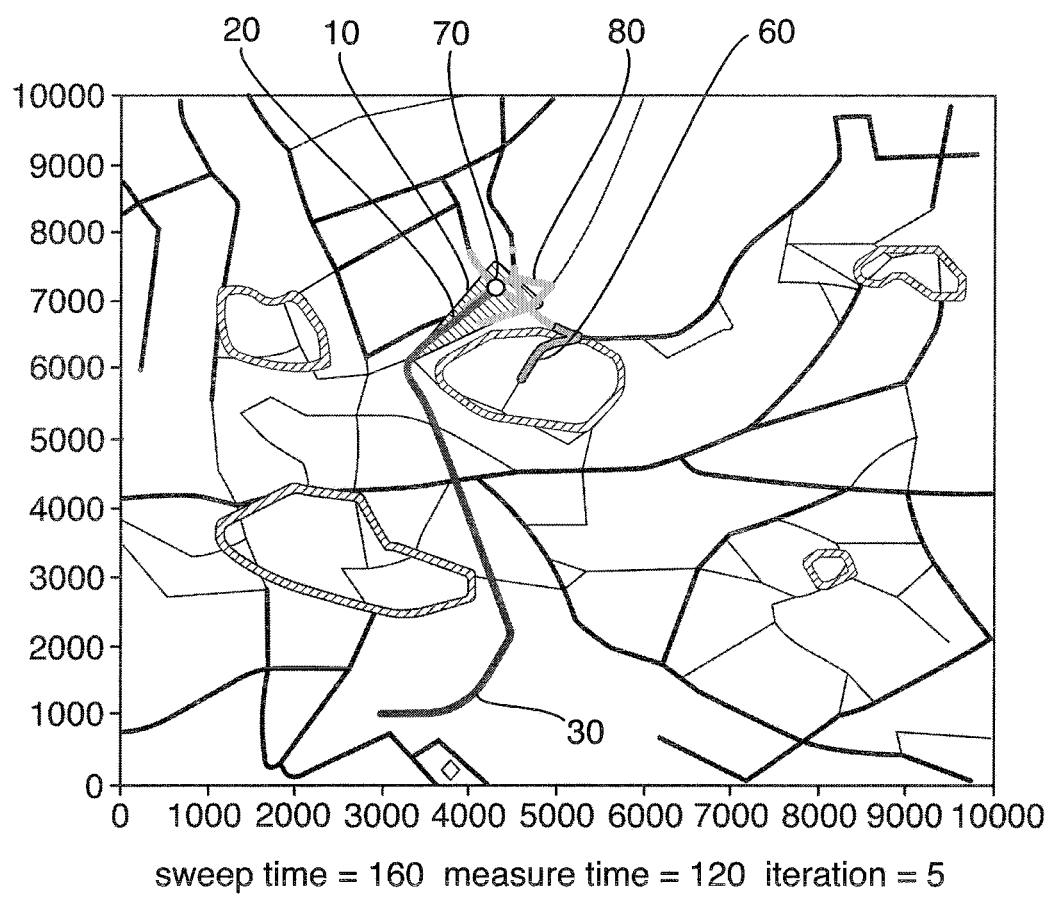
Figure 12:
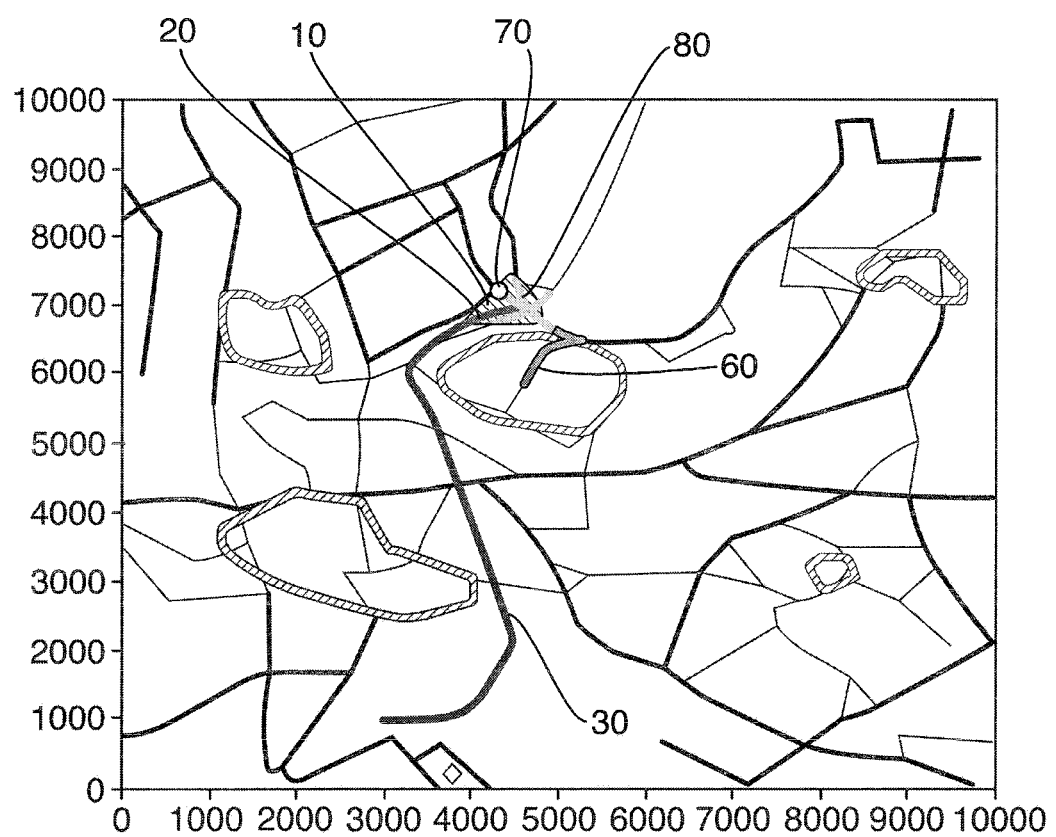

In FIG. 10 the West route becomes the only option however the track does not bend towards the targets that much because the cost due to miss distance has been saturated and only strongly influences the planned track at short range. In this case the costates have charged-up significantly to give a straight trajectory past the no go zone. There is a built-in cost contribution to ensure the final costates at the end of planned trajectories are zero, which should be the case for an optimal solution. However this cost component does not remove this charging-up tendency. Finally the central no-go area is passed and the planner heads towards the remaining possible target positions in FIG. 11. Finally in FIG. 12 the planner homes onto the centre of the target distribution.

Thus a practical method has been produced to solve the general problem of dealing with non-Gaussian guidance problems. The method has been applied to the example problem of dynamic mission planning of a pursuing air vehicle against a moving ground target, restricted to move on a network of roads.

The master-slave algorithm for finding an optimal trajectory, together with the modified optimal trajectory parameterization by costate that interacts with particle filter representation of target capability, gives a good method for finding workable solutions to navigating to ground targets on a network of roads where there is significant uncertainty in the future motion of the target in the presence of no-go areas. The master-slave algorithm has a random search component and only provides an approximate solution in a way that is similar to the use of particles in particle filtering to represent target probability distributions. As such, it is useful in producing gross navigation input to the guidance, and in the case of an external radar tracker the munition uses a short-range sensor to acquire the target at 500 m to go and home into the target using conventional homing. The results in the described example show some interesting emerging behaviour: the possible optional target positions are covered by suitable dogleg manoeuvres using good timing, and alternative optional trajectories are covered by the swarm of planned trajectories.

Embodiments of the invention can thus deal with the case where there are several possible target trajectories to choose from and where there is a significant difference in flight time to each target and the cost depends on a weighted mixture of possible targets. This allows embodiments of the invention to deal with uncertain future with a known probability distribution of cases where the estimation of target and optimal guidance cannot be separated into independent problems.

Regarding a "significant difference in flight time" mentioned above, flight time to a target ("time to go") is the total time of flight to a corresponding chosen PONA for a sample target track. Target tracks can be affected by one or more physical factors, these being for example the geography of the target trajectories themselves and the effect of no-go areas for the pursuer. In embodiments of the invention, the difference between times to go can be rendered small by choosing a large target sample and indeed a small difference is preferred but this increases the number of PONAs and the number of jumps. Each jump adds cost. Embodiments of the invention perform particularly well where the spread of time to go to a PONA for the individual target tracks in relation to a mean time to go for all the target tracks is significant. This can be said to be the case if the assumption that all the times to go are the same leads to a significant increase in overall performance cost. Generally, this occurs of there is a spread of the order of 30% or more in the flight times for the individual target tracks with regard to the mean flight time. Embodiments of the invention are particularly useful for example where a pursuer is delayed in order to get a better shot at the target while the uncertainty in target position (two or three different available exit routes from a no-go area for example) means the pursuer has to cover more than one route to the target.

Another way of expressing this significant difference in flight times is to say that the target routes, or tracks, cannot be smoothly deformed into each other.

Whilst the present invention has been described and illustrated with reference to particular embodiments, it will be appreciated by those of ordinary skill in the art that the invention lends itself to many different variations not specifically illustrated herein.

Where in the foregoing description, integers or elements are mentioned which have known, obvious or foreseeable equivalents, then such equivalents are herein incorporated as if individually set forth. Reference should be made to the claims for determining the true scope of the present invention, which should be construed so as to encompass any such equivalents. It will also be appreciated by the reader that integers or features of the invention that are described as preferable, advantageous, convenient or the like are optional and do not limit the scope of the independent claims. Moreover, it is to be understood that such optional integers or features, whilst of possible benefit in some embodiments of the invention, may be absent in other embodiments.

The invention claimed is:

1. A method of guiding a pursuer to a target, the method comprising:
   (a) providing a plurality of possible target trajectories, weighted to represent a probability distribution of the target trajectories;
   (b) providing a plurality of candidate guidance controls, parameterised by a candidate guidance parameter;
   (c) for each of a plurality of values of the candidate guidance parameter:
      a. determining a projected pursuer trajectory resulting from the candidate guidance control corresponding to the candidate guidance parameter value;
      b. using the projected pursuer trajectory so far developed, determining the next occurrence of a termination condition for the pursuer trajectory relative to any of the target trajectories for which a termination condition has not yet occurred;
      c. adjusting the projected pursuer trajectory, subsequent to that termination-condition occurrence, to account for that target trajectory;
      d. repeating steps b and c until the termination conditions corresponding to all of the plurality of possible target trajectories have been accounted for; and
      e. recording a cost for the candidate guidance control based on the projected pursuer trajectory and the miss distances at the termination-condition occurrence for each target trajectory;
   (d) generating a revised plurality of values of the candidate guidance parameter in view of the recorded costs of the candidate guidance controls;
   (e) repeating steps (c) and (d) a plurality of times and identifying an optimal guidance control based on the recorded costs;
   (f) applying the optimal guidance control to the pursuer to alter its actual trajectory;
   (g) obtaining updated possible target trajectories; and
   (h) repeating steps (b) to (g) a plurality of times.

2. A method as claimed in claim 1, in which the termination condition relative to a target trajectory is the point of nearest approach of the projected pursuer trajectory to the target trajectory.

3. A method as claimed in claim 2 wherein, for said plurality of possible target trajectories provided in step (a), the time of flight to a corresponding point of nearest approach for the pursuer trajectory relative to each of the target trajectories shows a spread of the order of 30% or more with regard to the mean time of flight for all the target trajectories.

4. A method as claimed in claim 1, in which the candidate guidance parameter is a costate parameter.

5. A method as claimed in claim 1, in which the target trajectories are described by non-Gaussian statistics.

6. A method as claimed in claim 5, in which the target trajectories are possible routes of a target vehicle.

7. A method as claimed in claim 1, in which the revised plurality of values of the candidate guidance parameter are generated using an optimisation algorithm.

8. A method as claimed in claim 1, in which the optimisation algorithm is a swarm algorithm.

9. A method as claimed in claim 8, in which the swarm algorithm is a master-slave swarm algorithm.

10. A method as claimed in claim 1, comprises uncurling a projected trajectory by damping a high-frequency oscillation in the projected trajectory.

11. A method as claimed in claim 1, in which said plurality of possible target trajectories provided in step (a) comprise a number of possible discrete trajectories.

12. A method according to claim 11, in which said possible discrete trajectories comprise road routes.

13. A method as claimed in claim 1, further comprising providing one or more pursuer state constraints such that each cost recorded in step (e) for the candidate guidance control is subject to said pursuer state constraint(s).

14. A system for guiding a pursuer to a target, the system comprising:
   a processing apparatus configured to obtain a plurality of possible target trajectories, weighted to represent a probability distribution of the target trajectories; and a plurality of candidate guidance controls, parameterised by a candidate guidance parameter;
   the processing apparatus being configured to perform the steps of:
   (a) for each of a plurality of values of the candidate guidance parameter,
      determining a projected pursuer trajectory resulting from the candidate guidance control corresponding to the candidate guidance parameter value;
      using the projected pursuer trajectory so far developed, determining the next occurrence of a termination condition for the pursuer trajectory relative to any of the target trajectories for which a termination condition has not yet occurred;
      adjusting the projected pursuer trajectory, subsequent to that termination-condition occurrence, to account for that target trajectory;
      repeating steps b and c until the termination conditions corresponding to all of the plurality of possible target trajectories have been accounted for; and
      recording a cost for the candidate guidance control based on the projected pursuer trajectory and the miss distances at the termination-condition occurrence for each target trajectory;
   (b) generating a revised plurality of values of the candidate guidance parameter in view of the recorded costs of the candidate guidance controls;
   (c) repeating steps (c) and (d) a plurality of times and identifying an optimal guidance control based on the recorded costs;
   (d) applying the optimal guidance control to the pursuer to alter its actual trajectory;
   (e) obtaining updated possible target trajectories; and
   (f) repeating steps (b) to (g) a plurality of times.

15. The system of claim 14 wherein the pursuer is a vehicle comprising the processing apparatus.

16. The system of claim 15 wherein the vehicle comprises a munition.

17. The system of claim 14 further including a ground based radar station comprising the processing apparatus.

* * * * *